United States Patent [19]

Reddy et al.

[11] Patent Number: 5,858,441
[45] Date of Patent: Jan. 12, 1999

[54] LOW FAT SPREAD

[75] Inventors: Podutoori Ravinder Reddy, Columbia; Thomas John Wajda, Jr., Westminster, both of Md.

[73] Assignee: Van den Bergh Foods Company, Division of Conopco, Inc., Lisle, Ill.

[21] Appl. No.: 917,538

[22] Filed: Aug. 22, 1997

Related U.S. Application Data

[63] Continuation of Ser. No. 521,937, Aug. 31, 1995, abandoned.

[51] Int. Cl.$^6$ .............................. A23D 7/00; A23D 7/02
[52] U.S. Cl. .................. 426/573; 426/601; 426/602; 426/603; 426/575; 426/576; 426/578
[58] Field of Search ................................ 426/601, 602, 426/603, 573, 576, 578, 575

[56] References Cited

U.S. PATENT DOCUMENTS

| | | | |
|---|---|---|---|
| 4,734,287 | 3/1988 | Singer et al. | |
| 4,917,915 | 4/1990 | Cain et al. | |
| 4,985,270 | 1/1991 | Singer | 426/656 |
| 5,021,248 | 6/1991 | Stark | 426/656 |
| 5,096,732 | 3/1992 | Mongeau et al. | |
| 5,104,674 | 4/1992 | Chen | 426/565 |
| 5,112,625 | 5/1992 | Zibell | 426/548 |
| 5,143,741 | 9/1992 | Podolski et al. | |
| 5,145,702 | 9/1992 | Stark | 426/656 |
| 5,151,451 | 9/1992 | Brown et al. | |
| 5,171,603 | 12/1992 | Singer | 426/804 |
| 5,194,285 | 3/1993 | Norton. | |
| 5,330,778 | 7/1994 | Stark | 426/656 |
| 5,393,550 | 2/1995 | Tarr | 426/661 |
| 5,516,543 | 5/1996 | Amankonak | 426/573 |
| 5,614,245 | 3/1997 | Gupta | 426/602 |
| 5,624,702 | 4/1997 | Schotel | 426/603 |
| 5,656,322 | 8/1997 | Livingston | 426/603 |
| 5,656,323 | 8/1997 | Underdown | 426/603 |

FOREIGN PATENT DOCUMENTS

92/20239  11/1992  WIPO.

OTHER PUBLICATIONS

Simplesse$^{(R)}$ All Natural Fat Substitute—A Scientific Overview, Second Edition.
Simplesse$^{(R)}$: The Principle/Ingredients and Process.
Simplesse$^{(R)}$: Spreads.
Food Business—Feb. 1993 "Pfizer Launches Dairy-Lo to the World".
Lowe 1937 Experimental Cookery 2nd ed. John Wiley & Sons, Inc New York pp. 266–275.

Primary Examiner—Carolyn Paden
Attorney, Agent, or Firm—Matthew Boxer

[57] ABSTRACT

A fat continuous spread having less than about 35 wt. % of a fat phase and a method of preparing the spread are described. The fat blend of the product must have a solid fat content at 10° C. of greater than 25 wt. % and the aqueous phase must contain 0.05 to 0.5 wt. % of a modified protein. The viscosity of the aqueous phase must be at least 25 mPa.s at a shear rate of 17090 sec$^{-1}$ and a temperature of 5° C.

19 Claims, No Drawings

LOW FAT SPREAD

This is a Continuation application of Ser. No. 08/521,937, filed Aug. 31, 1995, now abandoned.

FIELD OF THE INVENTION

The invention relates to a fat continuous spread containing less than 35 wt. % of a fat having a solid fat content at 10° C. of greater than 25 wt. % and a modified protein.

BACKGROUND OF THE INVENTION

A fat continuous spread having less than about 35 wt. % of a continuous fat phase is described. The fat phase contains a fat or a fat blend having a solid fat content at 10° C. of greater than 25 wt. %, while the aqueous phase contains 0.05 to 0.5 wt. % of a modified protein.

Fat continuous spreads or water-in-oil spreads are widely available commercially as a replacement for higher fat products such as butter or margarine. Such spreads should have a plastified continuous fat phase to give suitable spreadability and to prevent microbiological deterioration. The spreads should not release moisture when being spread yet should be spreadable at room temperature. Moreover, a desirable low fat spread should be stable at room temperature, but should destabilize and release its flavor when eaten by the consumer. All of these issues should also be addressed while providing a nutritious and good tasting product. With only a small amount of fat present in the product to be used to constitute the continuous phase, these goals are difficult to achieve.

Prior art formulators have addressed these concerns by producing spreads having a gel forming aqueous phase which must exhibit a minimum viscosity (see U.S. Pat. No. 4,917,915 issued to Cain et al.). These spreads, however, are destabilized upon the introduction of even a small amount of a non-gelling protein and will tolerate only gelling proteins to provide additional nutritional value.

A process for making a fat continuous spread having more than 200 ppm amino acid residues has been described in Norton, U.S. Pat. No. 5,194,285. The addition of only a small amount of native or unmodified protein to the fat continuous compositions will create a destabilized or less stable product unless the product is carefully processed.

High levels (5 wt. % and greater) of native proteins have been shown in the art to aid in processing of low fat spreads. The functional role of these proteins is to structure the aqueous phase due to gelling properties of these proteins (see Cain et al., U.S. Pat. No. 4,917,915).

High levels of modified protein have also been demonstrated for use in spreads. The role of these proteins is as fat replacers. See U.S. Pat. No. 5,151,451 (Brown et al.) and U.S. Pat. No. 5,096,732 (Mongeau et al.).

Low levels of modified whey protein (e.g., 1–3%) have also been used as fat replacers (see U.S. Pat. No. 4,734,287, Singer et al.). As fat replacers these proteins provide a sensation of fatty material and trick the mouth into believing it is tasting fat.

At these levels of proteins in low fat spread (i.e., 1–15 wt. %) stable fat continuous products are difficult to process. Proteins, either natural or modified, at these levels do not melt in the mouth and the resulting taste is unsatisfying.

There thus continues to exist the need for a low fat spread which provides both the nutritional and organoleptic properties of low fat spread products, particularly low fat butter products, while additionally being low in fat content. An improved low fat spread product which contains a higher level of solid fat at 10° C. yet is easier to process than commercially available low fat spreads is also desirable.

SUMMARY OF THE INVENTION

It has now been discovered that a low fat spread containing less than about 35 wt. % of a fat blend having an $N_{10}$ of greater than 25 wt. % and containing and 0.05 to 0.5 wt. % modified protein (percentages based on total composition) may be produced which provides the nutritional value and organoleptic properties of butter.

The low fat spread of the invention comprises 10 to about 35 wt. % of a continuous fat phase which has a fat blend having a solid fat content at 10° C. of 25 –50 wt. % and at 20°C. of 5–30 wt. %, 90 to 65 wt. % of a dispersed aqueous phase which has 0.05 to about 0.5 wt. % of a modified protein concentrate as defined below. The aqueous phase of the spread product is gel forming and has a viscosity of at least 25 mPa.s at a shear rate of 17090 sec$^{-1}$ and a temperature of 5°C.

A process for producing the novel products is also described.

DETAILED DESCRIPTION OF PREFERRED EMBODIMENTS

The low fat spread of the invention is a dispersion which has a plastified continuous fat phase and dispersed aqueous phase. The term "continuous fat phase" means oil which is present in the liquid state and which forms a continuous phase as well as the solid fat particles contained in the liquid oil that have been phase separated from the liquid oil by crystallization of fat by plastification. The term "continuous fat phase" does not include any fat contained in the dispersed aqueous phase such as occurs in the product having a so called oil-in-water-in-oil structure.

Fat Continuous Phase

The spread according to the invention comprises from about 10 to about 35 wt. % fat, more preferably about 15 to about 30 wt. % fat, most preferably 15 to 28 wt. % fat.

It is critical that the fat or fat blend used in the fat phase have a solid fat content (calculated on the weight of the fat) at 20°°C. of between 5 and 30 wt. %, preferably between 5 and 20 wt. %. At 10°C., the solid fat content must be greater than 25 wt. %, preferably 27–50 wt. %, most preferably 30–50 wt. %.

The solid fat content can conveniently be determined by measuring the NMR N-value as described in Fette, Seifen, Anstrichmiffel, 80 ( 1978) 180–186, which indicates the amount of fat present in the solid state expressed in percentage of the weight of the fat. The fat blend used in the spread may be from either a vegetable or animal source and the fat may be either natural or modified chemically or physically by, for example, fractionation, hydrogenation or interesterification. Preferred sources of vegetable oils include soybean oil, sunflower oil, palm oil, fish oil, rapeseed oil, coconut oil, and mixtures of two or more. Edible substances that are physically similar to triglycerides such as waxes, e.g. jojoba oil and poly fatty esters of mono- or disaturides may be used as replacement for or in a mixture with the triglycerides.

Animal fat sources include butter fat, fractionated butterfat, lard, tallow or mixtures thereof. It should be understood that butterfat is fractionated to form a liquid component at room temperature, most preferably a liquid component at 15°C. An example of a butterfat fraction is butter olein.

To achieve the solid fat content critical to the fat phase of the invention it is preferred to use a fat blend of a vegetable oil and butterfat or butterfat, its fractions and mixtures thereof. Most preferably, the fat blend is butterfat, fractionated butterfat and mixtures thereof.

Dispersed Aqueous Phase

The aqueous phase must be a gel forming composition, that is the composition must contain one or more gelling agents in a concentration at or above the critical concentration of that aqueous phase composition.

It is essential that the viscosity of the aqueous phase be at least 25 mPa.s at a shear rate of 17090 sec-$^1$ in a temperature of 5°C. An acceptable method of measuring the viscosity of the aqueous phase is described in U.S. Pat. No. 4,917,915 (Cain et al.) herein incorporated by reference. Specifically, the viscosity at 5°C. and a shear rate of 17090 sec-$^1$ is indicated as the M* value. The M* value is determined in a Ferranti-Shirley test using a Ferranti-Shirley Viscometer as described below. The viscosity at 5° C. and a shear rate of 17090 sec.-of the composition constituting the aqueous phase is determined in a Ferranti-Shirley test using a Ferranti-Shirley Viscometer ® with a standard cone having a diameter of 7 cm. The instrument is calibrated in a conventional manner using standard silicon oils of known viscosity as commonly used for the calibration of viscometers. The test is carried out with a fresh composition by mixing together the aqueous phase ingredients, homogenizing the mixture, heating it to 60 ° C., which (for most compositions) ensures that any gel structure that my have formed disappears again by melting, putting a sample of 3 ml. between cone and plate of the Ferranti Shirley Viscometer ®, cooling it down in 45 seconds from 60° C. to 5° C., and subjecting the sample to a shear rate of 17090 sec-$^1$ maintaining, the sample at 5° C. while shearing of the sample is continued, and recording the viscosity after 5 minutes. (If the composition contains a gelling agent having a melting point above 60° C., then the mixture is heated to a correspondingly higher temperature to ensure that any gel structure that may have formed, melts.) Throughout this specification, by viscosity is meant the ratio of the measured shear stress and the applied shear rate. Since, generally, gel-forming compositions are non-Newtonian fluids, the viscosity depends on the applied shear rate. This dependency of the viscosity on the shear rate varies substantially with the aqueous phase composition. It is an essential aspect of the present invention that the viscosity at 5° C. of the aqueous phase composition lies above the threshold value of 20 mPa.s when it is subjected to a shear rate as high as 17090 sec-$^1$. When this requirement is not met, then no satisfactory spread is obtained with such a composition constituting the aqueous phase.

No such correlation is found between the aqueous phase viscosity and the quality of the spread containing the aqueous phase, if the viscosity is measured at a low shear rate. For example, no correlation was found between the viscosity of aqueous phase compositions extrapolated to zero shear rate and the suitability of the compositions for use as aqueous phase in spreads with very low fat contents.

The viscosity of the composition constituting the aqueous phase of the present spread at a shear rate of 17090 sec-$^1$ should be at least 20 mPa.s when measured at 5° C.

For most compositions suitable to constitute the aqueous phase of the present spreads, the viscosity at 17090 sec-$^1$ is not strongly temperature dependent. For example, for most suitable compositions only a slightly different value is found if the viscosity of 17090 sec-$^1$ is measured at 25° C. or 30° C. instead of at 5° C. However, for some suitable aqueous phase compositions, the viscosity at the indicated shear rate varies substantially with the temperature at which the measurement is carried out. Unless indicated otherwise, the viscosity at 17090 sec-$^1$ is measured at 5° C., both for compositions exhibiting a strongly temperature dependent viscosity at 17090 sec-$^1$ and for compositions for which the viscosity at 17090 sec-$^1$ is not strongly temperature dependent.

The M*-value of the composition constituting the aqueous phase in the present spread preferably is at least 25 mPa.s, more preferably it is at least 30 mPa.s It is particularly preferred that the M*-value is at least 35 mPa.s.

A. Modified Protein

It is essential that the spread of the invention contain 0.05 to 0.5 wt. %, preferably 0.05 to 0.3 wt. %, most preferably 0.1 to 0.2 wt. % of a modified protein.

A modified protein is meant to mean a protein which is non-gelling at the amounts used in the inventive compositions and which is modified by a controlled denaturing process to substantially affect surface properties of the protein to form substantially non-aggregating particulates. The particulates may then be added to an aqueous phase such that when the aqueous is combined with a fat phase a water continuous emulsion is formed. The resulting water continuous emulsion may than be inverted to form a fat continuous product.

Controlled denaturation of the protein physically changes the protein in two significant ways, (1) the protein unfolds to expose hydrophobic regions on its polypeptide chains to thus impart a more amphophilic nature and (2) sulfhydryl and disulfide bond exchange occurs, which results in protein to protein interaction taking place. Denaturation is effected by both shearing and heating the protein at pasteurization temperatures as is known in the art and described in Singer (U.S. Pat. No. 4,734,287); Podolski (U.S. Pat. No. 5,143,741) and Brown (U.S. Pat. No. 5,151,451) herein incorporated by reference. Preferred modified proteins have a diameter particle size ranging from about 0.1 microns to less than 3 microns. The protein to be modified may be from either a vegetable or animal source. Animal proteins useful in the invention include dairy protein (e.g. whey and milk proteins such as casein) and egg white protein, (e.g. albumin). Vegetable protein sources include for example soy protein and corn protein.

Preferred protein sources are whey protein and soy protein. Particularly preferred is whey protein commercially available modified proteins include Simplesse ® modified whey proteins supplied by NutraSweet Co. of Deerfield, Illinois; Zein ® modified corn protein supplied by Opta Food Ingredients, Inc. of Bedford, Massachusetts and Hygel ® modified whey and soy proteins supplied by Unilever N.V. Most preferred modified proteins are Simplesse ® modified whey proteins.

B. Gelling Agents

Preferred gelling agents of the aqueous phase composition are gelatin, carrageenan, starch (e.g. gelatinized or ungelatinized rice, corn or tapioca) and gelling hydrolyzed starch derivatives (which in general, have relatively low DE-values). A preferred gelling maltodextrin, is, for example, Paselli maltodextrin SA2®, and mixtures thereof.

In addition to the gelling agent or agents, the aqueous phase composition may comprise thickening agents, and/or viscosity enhancers, e.g. guar gum and non-gelling hydrolyzed starch derivatives as described in Cain, U.S. incorporated by reference. Such thickeners preferably are present in the composition in an amount of 0–20 wt. % (calculated on the weight of the aqueous phase).

The amount of gelling agent that can suitably be used in the composition constituting the aqueous phase is between about 0.2 and 30 wt. %, preferably about 1 and about 25 wt. %, most preferably up to about 10 wt. % (on aqueous phase composition). The optimal amount of gelling agent or agents in the aqueous phase composition, however, depends to some extent on the other ingredients contained in the composition.

Although the above-indicated quantities are applicable for most aqueous phase compositions, there are exceptions. For example, when using as gelling agent a gelling milk protein, e.g. Ca-caseinate, which can have a relatively high critical concentration, it is desirable to use amounts higher than 10 wt. %.

C. Optional Ingredients

The aqueous phase composition may optionally comprise thickeners, other ingredients that are conventionally incorporated in spreads such as flavoring agent, coloring, emulsifiers, salt, preservatives, acidifiers, etc.

Similarly, additives may be contained in the fat phase composition. For example, the fat phase composition may comprise a blend of triglycerides supplemented with emulsifiers and coloring matter.

Although the aqueous phase composition may include some fat, the fat content is preferably not higher than about 10 wt. %. It is preferred that the aqueous phase composition comprises essentially no fat.

Typically the average droplet size of the dispersed aqueous phase is between about 15 to 100 microns, but it may be larger or smaller. The average droplet size, as referred to herein, is the volume weighted mean of the droplet size distribution. It can be determined with NMR following the procedure as described in J. Colloid and Interface Science (1972), 10, 206 and (1983), 93, 521.

With such a droplet size, on the one hand satisfactory flavor release in the mouth can be obtained, while on the other hand the produce can have an adequate microbiological stability. The average droplet size of the present spreads can be varied easily, by adjusting the conditions during the processing.

The present spreads can suitably be used for example, as a low fat butter spread or as a butter substitute. They can also used as a complete spread on their own, for example, when containing a cheese or a fruit flavor.

Processing

The spread according to the invention is prepared by admixing the aqueous phase and the fat phase to form a water continuous composition. The composition is then cooled from a temperature above a gel setting temperature of the composition to a temperature below the gel setting temperature to form a cooled water continuous composition. The cooled composition is then subjected to conditions of shear in a low shear crystallizing unit (i.e. C unit) to convert the water continuous composition into small gelled aqueous beads. The fat continuous dispersion is then formed by inverting either the water-continuous composition or the cooled water continuous composition while maintaining the temperature at below a gelled melting temperature in a high speed, high shear crystallizer (i.e. C* unit). The spread product is then packed and stored.

Modification of the process to increase residence time is possible by increasing the number of crystallizing units (C units) in the process. Additional cooling may be obtained by including a cooling unit (A unit) between the low shear crystallizer unit (C unit) and the high speed high shear crystallizer inverter unit (C* unit).

To illustrate the invention in more detail, the following non limiting examples are described.

Example 1

The following five fat continuous compositions were prepared:

|  | Sample 1 | Sample 2 | Sample 3 | Sample 4 | Sample 5 |
|---|---|---|---|---|---|
| OIL PHASE |  |  |  |  |  |
| Distilled Monoglyceride | 0.35 | 0.35 | 0.35 | 0.35 | 0.35 |
| Butter (80% fat) | 31 | 31 | 31 | 31 | 20.30 |
| Butter Olein | — | — | — | — | 8.75 |
| AQUEOUS PHASE |  |  |  |  |  |
| Whey (unmodified) | 1.375 | 1.375 | — | — | — |
| Simplesse Dry 100 ® modified protein[1] | — | — | 0.34 | 0.34 | 0.34 |
| Salt | 1.35 | 1.35 | 1.35 | 1.35 | 1.35 |
| Potassium Sorbate | 0.12 | 0.12 | 0.12 | 0.12 | 0.12 |
| Gelatin | 3.5 | 3.5 | 3.5 | 3.5 | 3.5 |
| Lactic Acid (to adjust pH to 4.8) | 0.1 | 0.1 | 0.1 | 0.1 | 0.1 |
| Rice Starch | 1.5 | 1.5 | 1.5 | 1.5 | 1.5 |
| Lactose | — | — | 1.035 | 1.035 | 1.035 |
| Water |  |  | to 100% |  |  |

[1]Modified whey protein in powdered form which contains about 50% lactose supplied by NutraSweet Co. of Deerfield, Illinois.

Samples 1–3 were prepared by a pre-gelation process (Process A) in which the oil and aqueous phases were admixed at 45° C. and passed through a scraped surface heat exchange (i.e. A-unit), then a crystallizer (i.e. C-unit) and another A-unit. The water continuous emulsion of the product was invented to a fat continuous dispersion in an inverter (i.e. C* unit) and the product was further cooled and packed. The throughput of the mixture was between 50 and 100 kilograms per hour.

Samples 4 and 5 were prepared by a modification of the above process (Process B) including additional A units to cool the emulsion before pregelation.

The packed compositions were evaluated for product quality and processability with the following results:

TABLE 2

| Sample | Process | Protein type (levels adjusted for constant | Fat blend | Tput | Product Quality and Processability |
|---|---|---|---|---|---|
| 1 | A | Whey | Butter N10 = 43 | 50 Kg/Hr | Slightly unstable, low tolerance of inversion |
| 2 | A | Whey | Butter N10 = 43 | >50 Kg/Hr | Unstable, difficult to invert and not processable |
|  |  | Simplesse 100 ® modified protein | Butter N10 = 43 | 50–100 Kg/Hr | Stable and inversion occurred |

TABLE 2-continued

| Sample | Process | Protein type (levels adjusted for constant | Fat blend | Tput | Product Quality and Processability |
|---|---|---|---|---|---|
| 4 | B | Simplesse 100 ® modified protein | Butter N10 = 43 | 50–100 Kg/Hr | Stable and inversion occurred |
| 5 | B | Simplesse 100 ® modified protein | Butter fat + Butter Olein (65.35) N10 = 35 | 50–100 Kg/Hr | Stable and inversion occurred |

Thus, compositions according to the invention (Samples 3–5) were stable and easily processed. In contrast, compositions outside the invention (Samples 1–2) could not be inverted and processed to form fat continuous compositions.

Example 2

In comparison, a prior art process using a modified whey protein supplied as Simplesse® and vegetable oil rather than butter fat was prepared. The composition had the following formula:

TABLE 3

| Ingredient | % |
|---|---|
| FAT PHASE | |
| Partially Hydrogenated Soybean Oil | 24.00 |
| Mono- and Diglycerides | 1.00 |
| Lecithin | 0.20 |
| AQUEOUS PHASE | |
| Potassium Sorbate | 0.10 |
| Sodium Benzoate | 0.10 |
| Salt | 1.30 |
| Flavoring | 0.10 |
| Vitamin A Palmitate | 0.036 |
| Color; 0.5% Beta Carotene Solution | 0.13 |
| Citric Acid, 10% Solution | 0.30 |
| Simplesse ® Dry 100[*1] modified protein | 1.00 |
| Xanthan gum | 0.3 |
| Propylene glycol alginate | 0.2 |
| Gelatin | 1.00 |
| Water | 70.77 |
| Total | 100.00% |

[1]Supplied as a dry modified whey powder containing about 50% lactose by NutraSweet Co.

The composition was processed according to a conventional fat continuous process wherein the ingredients of the fat phase were mixed together and heated to 60° C. The ingredients of the aqueous phase were added to the water heated to 65° C. to form a phase having a pH of 4.95. The aqueous phase was slowly added to the fat phase with thorough mixing.

It was observed that the formed emulsion of the prior art composition was water continuous and that it was not possible to produce a fat continuous spread as taught in the art.

We claim:

1. A fat continuous spread comprising:
   a) 10 to about 35 wt. % of a fat blend having a solid fat content at 10° C. of greater than 25 wt. % and at 20° C. of 5–30 wt. %; and
   b) 90 to 65 wt. % dispersed aqueous phase having 0.05 to 0.5 wt. % of a modified protein which is non-gelling and which is in the form of substantially non-aggregated particulates; the aqueous phase is gel forming and has a viscosity of at least 25 mPa.s at a shear rate at 17090 sec$^1$ and a temperature of 5C.

2. A spread according to claim 1 wherein the fat blend has a solid fat content at 10° C. of 27–50 wt. %.

3. A spread according to claim 2 wherein the fat blend is vegetable fat, animal fat and mixtures thereof.

4. A spread according to claim 3 wherein the fat blend is a butterfat, a butterfat fraction and mixtures thereof.

5. A spread according to claim 4 wherein the butterfat fraction is butter olein.

6. A spread according to claim 1 wherein the modified protein is present in an amount of 0.05 to 0.3 wt. %.

7. A spread according to claim 1 wherein surface properties of the modified protein are substantially different from surface properties of a native protein.

8. A spread according to claim 7 wherein the particulates of the modified protein have a diameter size ranging from 0.1 to 3 microns.

9. A spread according to claim 1 wherein the aqueous phase comprises 1–25 wt. % gelling agent.

10. A spread according to claim 9 wherein the gelling agent is selected from the group consisting of gelatin, carrageenan, pectin, starch, agar or mixtures thereof.

11. A process for preparing a fat continuous spread comprising the steps of:
   a) selecting a fat phase having 10 to about 35 wt. % of a fat blend having a solid fat content at 10° C. of greater than 25 wt. % and at 20° C. of 5–30 wt. %;
   b) preparing 90 to 65 wt. % of an aqueous phase comprising 0.05 to 0.5 wt. % of a modified non-gelling protein which is in the form of substantially nonaggregated particulates and a gelling agent present in a concentration at or above a critical concentration of the aqueous phase;
   c) mixing the fat phase and aqueous phase to form a water continuous composition from a temperature above a gel setting temperature of the water continuous composition to a temperature below the gel setting temperature to form a cooled water continuous composition;
   d) subjecting the cooled water continuous composition to such conditions of shear to convert the composition into small gelled aqueous bead; and
   e) forming a fat continuous dispersion from the water-continuous composition or the cooled water continuous composition while maintaining the temperature at below a gelled melting temperature, the aqueous phase of the product having a viscosity of at least 25 mPa.s at a shear rate of 17090 sec$^{-1}$ and a temperature of 50C. and the product having an average droplet size of the dispersed aqueous phase of between about 15 and 100 microns.

12. The process according to claim 11 wherein the fat blend is present in an amount of 10 to about 30 wt. %.

13. The process according to claim 11 wherein the fat blend has a solid fat content at 10° C. of 27–50 wt. %.

14. The process according to claim 11 wherein the fat blend is vegetable fat, animal fat and mixtures thereof.

15. The process according to claim 14 wherein the fat blend is a butterfat, a butterfat fraction and mixtures thereof.

16. The process according to claim 11 wherein the modified protein is denatured by a controlled process which substantially alters the surface properties of the protein.

17. The process according to claim 11 wherein the particulates of the modified protein have a diameter size ranging from 0.1 to 3 microns.

18. A fat continuous spread comprising:
   a) 10 to about 35 wt. % of a fat blend having a solid fat content at 10C of greater than 25 wt. % and at 20° C. of 5–30 wt. %; and
   b) 90 to 65 wt. %, dispersed aqueous phase having 0.05 to 0.5 wt. % of a modified protein which is non-gelling and which is in the form of substantially non-aggregated particulates;
   the aqueous phase is gel forming and has a viscosity of at least 25 mPa.s at a shear rate at 17090 sec$^{-1}$ and a temperature of 5° C., and wherein average droplet size of the dispersed aqueous phase is between about 15 to 100 microns.

19. A fat continuous spread comprising:
   a) 10 to about 35 wt. % of a fat blend having a solid fat content at
   10°C. of greater than 25 wt. % and at 20°C. of 5–30 wt. %; and
   b) 90 to 65 wt. %, dispersed aqueous phase having 0.05 to 0.5 wt. %
   of a modified protein which is non-gelling and which is in the form of
   substantially non-aggregated particulates;
   the aqueous phase is gel forming and has a viscosity of at least 25 mPa.s at a shear rate at 17090 sec-1 and a temperature of 5°C.
   and wherein average droplet size of the dispersed aqueous phase is between about 15 to 100 microns and provides flavor release in the mouth.

* * * * *